United States Patent
Bench et al.

(10) Patent No.: US 11,901,642 B1
(45) Date of Patent: *Feb. 13, 2024

(54) INPUT MULTIPLEXED SIGNAL PROCESSING APPARATUS AND METHODS

(71) Applicant: SeeScan, Inc., San Diego, CA (US)

(72) Inventors: Stephanie M. Bench, Atlanta, GA (US); Mark S. Olsson, La Jolla, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,533

(22) Filed: Nov. 19, 2021

Related U.S. Application Data

(63) Continuation of application No. 16/833,426, filed on Mar. 27, 2020, now Pat. No. 11,196,181.

(60) Provisional application No. 62/824,937, filed on Mar. 27, 2019.

(51) Int. Cl.
| | |
|---|---|
| *H01Q 23/00* | (2006.01) |
| *H01Q 1/24* | (2006.01) |
| *H01Q 1/52* | (2006.01) |
| *H01Q 7/06* | (2006.01) |

(52) U.S. Cl.
CPC ............ *H01Q 23/00* (2013.01); *H01Q 1/243* (2013.01); *H01Q 1/521* (2013.01); *H01Q 7/06* (2013.01)

(58) Field of Classification Search
CPC .......... H01Q 7/06; H01Q 1/521; H01Q 1/243; H01Q 23/00
See application file for complete search history.

(56) References Cited

U.S. PATENT DOCUMENTS

| | | |
|---|---|---|
| 4,710,708 A | 12/1987 | Rorden et al. |
| 4,737,794 A | 4/1988 | Jones |
| 4,933,640 A | 6/1990 | Kuckes |
| 5,043,666 A | 8/1991 | Tavernetti et al. |
| 5,093,622 A | 3/1992 | Balkman |

OTHER PUBLICATIONS

International Searching Authority, "Written Opinion of the International Searching Authority" for PCT Patent Application No. PCT/US20/25547, dated Oct. 1, 2020, European Patent Office, Munich.

*Primary Examiner* — Graham P Smith
(74) *Attorney, Agent, or Firm* — Steven C. Tietsworth, Esq.; Michael J. Pennington, Esq.

(57) ABSTRACT

Front end circuits and associated apparatus, systems, and methods for use in electronic devices such as buried utility locators are disclosed. The circuits include receivers and filters on input signals that are coupled to ground rather than differentially. A multiplexing circuit allows shared use of amplifiers, and analog-to-digital converters via a switching mechanism for selectively making or breaking electrical connection to the receiver channels for efficient sharing of electronics resources while minimizing crosstalk interference and advantageously reducing costs.

14 Claims, 7 Drawing Sheets

Prior-Art Signal Processing Circuitry

Prior-Art Signal Processing Circuitry

Prior-Art Signal Processing Circuitry

INPUT MULTIPLEXED SIGNAL PROCESSING APPARATUS AND METHODS

CROSS-REFERENCE TO RELATED APPLICATIONS

This application claims priority under 35 U.S.C. § 119(e) to U.S. Provisional Patent Application Ser. No. 62/824,937, entitled LOW COST AND HIGH PERFORMANCE SIGNAL PROCESSING IN A BURIED OBJECT LOCATOR SYSTEM, filed on Mar. 27, 2019, the content of which is hereby incorporated by reference herein in its entirety for all purposes.

FIELD

This disclosure relates generally to front end circuits and systems for electronic devices having multiple input signals. More specifically, but not exclusively, the disclosure relates to apparatus, systems, and methods for high performance and low cost signal processing using input signal multiplexing and associated signal processing in a buried utility locator device and system as well as other devices having multiple inputs.

BACKGROUND

There are many situations where it is desirable to locate buried utility objects such as pipes, cables, or other conductors. For example, before starting any new construction involving excavation, it is important to locate existing underground utilities such as underground power-lines, gas lines, phone lines, fiber optic cable conduits, CATV cables, sprinkler control wiring, water pipes, sewer pipes, etc., (collectively and individually referred to hereinafter as "utilities" or "buried objects"). As used herein the term "buried" refers not only to objects below the surface of the ground, but in addition, to objects located inside walls, between floors in multi-story buildings or cast into concrete slabs, etc. If a backhoe or other excavation equipment hits a high voltage line or a gas line, serious injury and property damage may result. Severing water mains and sewer lines leads can lead to messy and expensive clean up as well as property damage. The destruction of power and data lines may seriously disrupt the comfort and convenience of residents and result in huge financial losses for affected businesses as well as for repair to the lines and other affected buildings or other facilities.

Buried objects may be located, for example, by sensing an alternating current (AC) electromagnetic signal emitted by the buried objects, for example by antenna arrays to receive magnetic field signals and provide multiple simultaneous outputs. Some objects such as power-lines are already energized and emit their own electromagnetic field signals. Location of other conductive lines may be facilitated by energizing the objects sought with an outside electrical source having a frequency typically in the region of approximately 50 Hz to 500 kHz. These devices are commonly known in the field as "transmitters" and they generate current signals that are coupled directly or inductively to a target utility, with the current signals then flowing in the utility to generate corresponding magnetic field signals for sensing by an associated buried object locator.

Portable buried object locators (also denoted herein as a "utility locator," "line locator," "locator device," or simply "locator" for brevity) are devices that are commonly used to locate such buried objects. Locators include, amongst other elements, one or more antenna arrays having antenna coils that may be oriented and positioned in different arrangements to sense electromagnetic signals emitted by conductive buried objects. The accuracy of portable utility locators is limited by the sensitivity of their antennas. Crosstalk or other signal interference caused by capacitance or inductance in the antenna structures causes resonance and interference. Locator devices may include one or more front-end signal processing circuits to process signals sensed directly from the antennas in an attempt to optimize digital signal outputs to a digital signal processor and ultimately for precisely locating the buried objects. Such front-end signal processing circuits generally include a variety of circuit elements such as low-pass differential filters, amplifiers, analog-to-digital converters, and/or the like. Existing circuits typically use multiple instances of the same electronics for processing antenna output signals from each separate antenna coil or other antenna element in a multi-element antenna array. For example, some locators made by Applicant use two or more three axis orthogonal antenna arrays, with each of the three axis arrays including three orthogonally oriented coils. In addition, two gradient antenna coils are often used with the three axis antenna arrays, providing a total of eight antenna coils with eight corresponding outputs. Newer designs of locators made by Applicant use more coils, such as in a dodecahedral antenna array with twelve individual coils.

Increasing demand to improve the signal quality and output has led to an increased number of circuit elements being added to the locators to process antenna output signals from multiple antennas, some of which are undesirably expensive. For example, the front-end signal processing circuit of most common traditional locators requires a large number of amplifiers and expensive analog-to digital converters, typically at least one for each of a plurality of receiver channels corresponding to a plurality of antenna coils, thus increasing both the manufacturing costs and circuit size as well as power consumption of the circuit and overall locator device.

Little to no efforts have been made in the past to offset the increased cost by reducing, in particular, the number of analog-to-digital converters to one multi-channel analog-to-digital converter that is switchable amongst the plurality of antenna coil and receiver channels to receive analog input signals from one channel at a time for conversion into a digital output. This approach, however, suffers from numerous drawbacks. For example, switching from one channel to another slows down the signal processing significantly, and introduces undesirable crosstalk interference in switching between channels. Further, this approach has limited use only and specifically in low frequency locators due to slow switching, which makes it practically impossible to do sampling at a higher frequency (e.g., 500 khz).

Accordingly, there is a need in the art for an apparatus and methods for cost-effective and high performance signal processing in locator systems that address the above-described as well as other problems.

SUMMARY

This disclosure relates generally to front end circuits and systems for electronic devices having multiple input signals. More specifically, but not exclusively, the disclosure relates to apparatus, systems, and methods for high performance and low cost signal processing using input signal multiplexing and associated signal processing in a buried utility locator device and system as well as other devices having multiple inputs.

For example, in one aspect the disclosure is directed to a buried utility locator. The locator may include, for example, a plurality of magnetic field sensing antenna coils and a signal processing circuit. The signal processing circuit may include a plurality of receiver channel circuits having inputs operatively coupled to corresponding outputs of the magnetic field sensing antenna coils for receiving output signals from the antenna coils, a multiplexing circuit operatively coupled to outputs of the receiver channel circuits for time division multiplexing the receiver channel circuit outputs and providing multiplexed output signals, one or more connected amplifiers, with at least one connected amplifier operatively coupled to an output of the multiplexing circuit, one or more analog-to-digital converters operatively coupled to outputs of the one or more connected amplifiers, wherein the total number of analog-to digital converters is smaller than the number of receiver channel circuits and antenna coils, and a digital signal processing circuit operatively coupled to outputs of the one or more analog-to-digital converters to process the receiver channel outputs to determine information associated with a sensed buried utility.

In another aspect, the disclosure is directed to an electronic front end circuit for use in coupling a plurality of antennas to a device. The front end circuit may, for example, include a plurality of receiver channel circuits operatively coupled to corresponding outputs of the antennas. The receiver channel circuits may include a low pass filter circuit configured so as to couple a signal path to ground single-endedly rather than being differentially coupled at their outputs. The lowpass filter circuit may include two capacitors and a resistor coupled therebetween. One terminal of each capacitor may be coupled to ground. The other terminal of the first of the two capacitors may be operatively coupled to an antenna output and the other terminal of the second of the two capacitors may be operatively coupled to a multiplexing circuit. The multiplexing circuit may be operatively coupled to the outputs of the receiver channel circuits for time division multiplexing receiver channel circuit output signals and providing multiplexed output signals. The multiplexing circuit may include a switching circuit for time-division multiplexing signals from ones of the plurality of receiver channels. One receiver channel may be put into an open state at a time, thereby allowing its signal past the switching mechanism. The remainder of the receiver channels may be put into a closed state during this time to block their signal past the switching mechanism. The receiver circuit channels that are in a closed state may be configured to maintain a load having an impedance matching the circuit past the switching mechanism. The front end circuit may further include a first and a second connected wideband amplifier and a damped lowpass filter coupled between an output of the multiplexing circuit and the first wideband amplifier. The damped low-pass filter may be operatively coupled to ground rather than differentially. An output of the first wideband amplifier may be operatively coupled to an input of the second wideband amplifier. A low signal circuit may be coupled between an output of the second wideband amplifier and one of the analog to digital converters. A high signal circuit may be coupled between an output of the first wideband amplifier and another of the analog to digital converters. The front end circuit may include one or more analog-to-digital converters operatively coupled to outputs of the one or more connected amplifiers. The total number of analog-to digital converters may be smaller than the number of receiver channel circuits and antenna coils. The front end circuit may include an anti-aliasing filter coupled between the first wideband amplifier and the another of the analog to digital converters, and a digital signal processing circuit operatively coupled to outputs of the one or more analog-to-digital converters to process the receiver channel outputs to determine information associated with signals received at the plurality of antennas. The locator may include a wired or wireless transceiver module. The determined information may be sent, via the wired or wireless transceiver module, to a communicatively coupled device.

In another aspect, the disclosure is directed to a signal processing method for use in a buried utility locator or other device. The method may include, for example, receiving, at a plurality of antenna coils, signals from a buried utility, providing, as outputs of the antenna coils, output signals to a corresponding plurality of receiver channel circuits, single-endedly coupling outputs from the receiver channel circuits to ground through a filter circuit, providing the receiver channel output signals to a time divisional multiplexing circuit, multiplexing the receiver channel output signals in the multiplexing circuit, providing the multiplexing circuit output signals to one or more connected amplifier circuits, amplifying and/or otherwise processing the received multiplexing circuit output signals in the connected amplifier circuits, providing outputs of the amplifier circuit analog signals to one or more analog to digital converters, converting the analog signals to digital signals in the one or more analog to digital converters, providing the digital signals to a digital signal processing circuit, and determining information about the buried utility by processing the digital signals in the digital signal processing circuit.

In another aspect, a low cost and high performance front-end signal processing circuit is disclosed that has a plurality of receiver channels. Each receiver channel may include an antenna coil coupled to a low pass filter whose elements are returned to ground rather than differentially. The circuit may include a switching mechanism for time multiplexing between ones of the plurality of receiver channels. The switching mechanism may further connect to a damped low pass filter whose elements are returned to ground rather than differentially and further connect to a first wide band amplifier. The first wide band amplifier may further separately connect to a low-signal circuit element and a high-signal circuit element. The low-signal circuit element may, continuing from the first wide band amplifier, include a second wide band amplifier further connecting to an anti-aliasing filter which in turn is connected to a first analog-to-digital converter (ADC). The high-signal circuit element may, separably continuing from the first wide band amplifier, include an anti-aliasing filter connected to a second ADC. The circuit may further include a digital signal processor (DSP) connected to both the first and second ADC.

In a connected state, a receiver channel may provide sensed and filtered signals to the damped low pass filter whose elements are returned to ground rather than differentially, first wide band amplifier, and low-signal circuit element and high-signal circuit element. In a disconnected state, the switch may prevent signals to travel to the damped low pass filter whose elements are returned to ground rather than differentially, first wide band amplifier, and low-signal circuit element or high-signal circuit element. When in a disconnected state, the receiver channel may receive the incoming signal resulting in a load having an impedance matching that of the damped low pass filter whose elements are returned to ground rather than differentially and first wide band amplifier.

In a connected state, signals reaching the first wide band amplifier are amplified to produce a first output having a first gain value. This first output is provided simultaneously as an input to the low-signal circuit element and the high-signal circuit element. In the low-signal circuit element, the input may be provided to the second wide band amplifier further connected to an anti-aliasing filter which in turn is connected to the first ADC producing a first digital output at a second, amplified gain level. When clipping occurs at the second wide band amplifier, the phase of the signal may be preserved due to the wide band aspect of the second wide band amplifier. In the high-signal circuit element, the input may be provided to an antialiasing filter which in turn is connected to the second ADC producing a second digital output at the first gain level. The DSP, receiving the first digital output from the high-signal circuit element and the second digital output from the low-signal circuit element, may use some clipping statistics to determine which digital output to utilize in determining the location of the signal source. As phase is preserved in signals clipping at the second wide band amplifier, the DSP may, in some instances, opt to reconstruct signals using digital input signals from the first ADC and second ADC. As a result, additional gain is achieved at all frequencies before clipping limits the system performance while providing lower cost and more compact circuitry with lower power consumption.

The present disclosure is also directed to methods for switching between receive channels and ADC digital outputs at the DSP. Such methods may include actuating a locator device and sensing the signal at a first receiver channel. The DSP may sample the resulting digital output signal of the first ADC from the low-signal circuit element. Upon detecting clipping at the first ADC beyond a threshold according to some clipping statistic, the DSP may begin sampling the digital output signal from the second ADC of the high-signal circuit element. Once sampled, the front-end signal processing circuit may repeat the method switching to a new receiver channel. Various additional aspects are described further below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
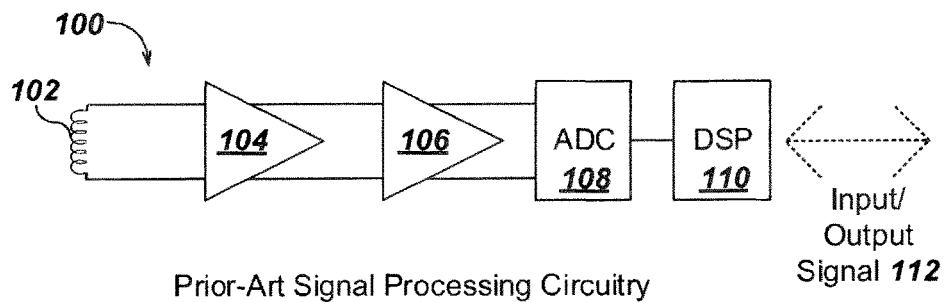
FIG. 1 shows a prior art signal processing circuit for use in locators having a single antenna coil.

This disclosure relates generally to systems and methods for locating buried or otherwise inaccessible pipes and other conduits, cables, and other conductive elements and more particularly to apparatus and methods for high performance and low cost signal processing in a buried object locator device and systems.

For example, in one aspect, the disclosure is directed to a low cost and high performance front-end signal processing circuit is disclosed that includes a number of receiver channels that may be switched to via a coupled switching mechanism. Each receiver channel may include a filter whose elements are returned to ground rather than differentially which may be disposed approximate to and coupled to a corresponding antenna coil.

The switching mechanism may, for example, have a plurality of separably actuable switches disposed approximate to the filters for selectively making or breaking the electrical connection to the receiver channels for faster and efficient sharing of resources without introducing any crosstalk interference and advantageously reducing the manufacturing cost such that one receiver channel may be in a connected state, providing signal to the circuit past the switching mechanism, or in a disconnected state, keeping signal at the receiver channel and not allowing signal to travel to the circuit past the switching mechanism. In a closed state, receiver channels may have a load having an impedance matching that of the circuit beyond the switching mechanism.

In an open state, signal may be provided from the open receiver channel to an additional low pass filter whose elements are returned to ground rather than differentially to reduce noise introduced at switching and further on a first wide band amplifier. The first amplifier may supply an output signal having a first increased gain level. From the first amplifier, the circuit may separately connect to a low-signal circuit element and high-signal circuit element. In the high-signal circuit element, the input may be provided to an antialiasing filter which in turn is connected to an analog-to-digital converter (ADC) producing a first digital output at the first gain level. In the low-signal circuit element, the input may be provided to a second wide band amplifier further connecting to an antialiasing filter, which in turn is connected to a separate ADC producing a second digital output at a second, amplified gain level. Both ADCs may connect to a digital signal processor (DSP) that may, through some clipping statistic, determine which digital output to use. As a result, additional gain is achieved at all frequencies before clipping limits the system performance while providing lower cost and more compact circuitry with lower power consumption. The overall circuit may utilize fewer components, in particular expensive and power hungry ADCs as well as amplifiers, over known prior art. The reduced number of circuit components further leads to a smaller circuit size and improved gain on low frequency signals. For example, in one aspect the disclosure is directed to a buried utility locator. The locator may include, for example, a plurality of magnetic field sensing antenna coils and a signal processing circuit. The signal processing circuit may include a plurality of receiver channel circuits having inputs operatively coupled to corresponding outputs of the magnetic field sensing antenna coils for receiving output signals from the antenna coils, a multiplexing circuit operatively coupled to outputs of the receiver channel circuits for time division multiplexing the receiver channel circuit outputs and providing multiplexed output signals, one or more connected amplifiers, with at least one connected amplifier operatively coupled to an output of the multiplexing circuit, one or more analog-to-digital converters operatively coupled to outputs of the one or more connected amplifiers, wherein the total number of analog-to digital converters is smaller than the number of receiver channel circuits and antenna coils, and a digital signal processing circuit operatively coupled to outputs of the one or more analog-to-digital converters to process the receiver channel outputs to determine information associated with a sensed buried utility.

The plurality of magnetic field sensing antenna coils may, for example, include eight or more antenna coils arranged in two or more orthogonal antenna arrays and a pair of gradient antenna coils. The plurality of magnetic field sensing antenna coils may include twelve antenna coils arranged in a dodecahedral antenna array. The, receiver channel circuits may include a low pass filter circuit for coupling a signal path to ground rather than being differentially coupled at an its output to the multiplexing circuit. The multiplexing circuit may include a switching circuit including a plurality of switching elements for time-division multiplexing signals from ones of the plurality of receiver channels. One receiver channel may be put in an open state at a time allowing its signal past the switching mechanism, and the remainder of receiver channels may be put into a closed state to block their signal past the switching mechanism. The receiver channels that are in a closed state may be configured to maintain a load having an impedance matching the circuit past the switching mechanism.

The low pass filter circuit may, for example, comprise two capacitors and a resistor coupled therebetween. One terminal of each capacitor may be operatively coupled to ground and the other terminal of the first of the two capacitors may be operatively coupled to an antenna coil output and the other terminal of the second of the two capacitors may be operatively coupled to the multiplexing circuit. The connected amplifiers may include a first wideband amplifier and a second wideband amplifier. The connected amplifiers may further include a damped lowpass filter coupled between an output of the multiplexing circuit and the first wideband amplifier. The damped lowpass filter may be coupled single-sidedly to ground rather than differentially. An output of the first wideband amplifier may be coupled to an input of the second wideband amplifier and to an analog to digital converter. The locator may further include a low signal circuit coupled between an output of the second wideband amplifier and one of the analog to digital converters, and a high signal circuit coupled between an output of the first wideband amplifier and another of the analog to digital converters. The locator may include an anti-aliasing filter coupled between the first wideband amplifier and the another of the analog to digital converters.

The locator may, for example, include a plurality of the signal processing circuits coupled to outputs of the plurality of antenna coils in various configurations. For example, each of the separate signal processing circuits may be coupled to separate antenna coils elements or, in some embodiments, may be coupled in parallel or series. In another example, the locator or device may include twelve magnetic field sensing antenna coils coupled for processing to three of the signal processing circuits.

The antialiasing filter may, for example, be configured to separate high-signal circuit signals and low-signal circuit signals from reaching respective ADCs simultaneously. Low frequency and high frequency time delays may be electronically adjusted for in ADC sampling timing. The locator may include a wired or wireless transceiver module. The determined information may be sent, via the wired or wireless transceiver module, to a communicatively coupled device.

In another aspect, the disclosure is directed to an electronic front end circuit for use in coupling a plurality of antennas to a device. The front end circuit may, for example, include a plurality of receiver channel circuits operatively coupled to corresponding outputs of the antennas. The receiver channel circuits may include a low pass filter circuit configured so as to couple a signal path to ground single-endedly rather than being differentially coupled at their outputs. The lowpass filter circuit may include two capacitors and a resistor coupled therebetween. One terminal of each capacitor may be coupled to ground. The other terminal of the first of the two capacitors may be operatively coupled to an antenna output and the other terminal of the second of the two capacitors may be operatively coupled to a multiplexing circuit. The multiplexing circuit may be operatively coupled to the outputs of the receiver channel circuits for time division multiplexing receiver channel circuit output signals and providing multiplexed output signals. The multiplexing circuit may include a switching circuit for time-division multiplexing signals from ones of the plurality of receiver channels. One receiver channel may be put into an open state at a time, thereby allowing its signal past the switching mechanism. The remainder of the receiver channels may be put into a closed state during this time to block their signal past the switching mechanism. The receiver circuit channels that are in a closed state may be configured to maintain a load having an impedance matching the circuit past the switching mechanism. The front end circuit may further include a first and a second connected wideband amplifier and a damped lowpass filter coupled between an output of the multiplexing circuit and the first wideband amplifier. The damped lowpass filter may be operatively coupled to ground rather than differentially. An output of the first wideband amplifier may be operatively coupled to an input of the second wideband amplifier. A low signal circuit may be coupled between an output of the second wideband amplifier and one of the analog to digital converters. A high signal circuit may be coupled between an output of the first wideband amplifier and another of the analog to digital converters. The front end circuit may include one or more analog-to-digital converters operatively coupled to outputs of the one or more connected amplifiers. The total number of analog-to digital converters may be smaller than the number of receiver channel circuits and antenna coils. The front end circuit may include an anti-aliasing filter coupled between the first wideband amplifier and the another of the analog to digital converters, and a digital signal processing circuit operatively coupled to outputs of the one or more analog-to-digital converters to process the receiver channel outputs to determine information associated with signals received at the plurality of antennas. The locator may include a wired or wireless transceiver module. The determined information may be sent, via the wired or wireless transceiver module, to a communicatively coupled device.

In another aspect, the disclosure is directed to a signal processing method for use in a buried utility locator or other device. The method may include, for example, receiving, at a plurality of antenna coils, signals from a buried utility, providing, as outputs of the antenna coils, output signals to a corresponding plurality of receiver channel circuits, single-endedly coupling outputs from the receiver channel circuits to ground through a filter circuit, providing the receiver channel output signals to a time divisional multiplexing circuit, multiplexing the receiver channel output signals in the multiplexing circuit, providing the multiplexing circuit output signals to one or more connected amplifier circuits, amplifying and/or otherwise processing the received multiplexing circuit output signals in the connected amplifier circuits, providing outputs of the amplifier circuit analog signals to one or more analog to digital converters, converting the analog signals to digital signals in the one or more analog to digital converters, providing the digital signals to a digital signal processing circuit, and determining information about the buried utility by processing the digital signals in the digital signal processing circuit.

The plurality of antenna coils may, for example include eight antenna coils. The plurality of antenna coils may include twelve antenna coils arranged in a dodecahedral antenna array. The amplifier circuits may comprise a first wideband amplifier and a second wideband amplifier. The analog to digital converters may comprise a first ADC and a second ADC. An output of the first wideband amplifier may be operatively coupled to the second ADC and to the second wideband amplifier. An output of the second wideband amplifier is operatively coupled to the first ADC. An output of the first wideband amplifier may be operatively coupled to an anti-aliasing filter between the wideband amplifier output and the second ADC. The multiplexing circuit may include a switching circuit for time-division multiplexing signals from ones of the plurality of receiver channels. The method may include one receiver channel being put in an open state at a time allowing its signal past the switching mechanism, and the remainder of receiver channels being put into a closed state to block their signal past the switching mechanism. The receiver channels that are in a closed state may be configured to maintain a load having an impedance matching the circuit past the switching mechanism. The method may include storing the determined information in a non-transitory storage medium. The method may include providing a display of the determined information on a visual display device. The method may include adjusting low frequency and high frequency time delays for ADC sample timing. The method may include sending, via a wired or wireless transceiver module, the determined information to a communicatively coupled device.

Details of various apparatus, systems, devices, and methods referred to herein and additional components, methods, and configurations that may be used in further utility locator and other device embodiments in combination with the embodiments and details described herein are disclosed in various co-assigned patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 9,625,602, issued Apr. 18, 2017, entitled SMART PERSONAL COMMUNICATION DEVICES AS USER INTERFACES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKETS AND HELICAL COIL TYPE ELECTRICAL CORDS; U.S. Pat. No. 7,969,151, issued Jun. 28, 2011, entitled PRE-AMPLIFIER AND MIXER CIRCUITRY FOR A LOCATOR ANTENNA; U.S. Pat. No. 8,013,610, issued Sep. 6, 2011, entitled HIGH-Q SELF TUNING LOCATING TRANSMITTER; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 8,248,056, issued Aug. 21, 2012, entitled BURIED OBJECT LOCATOR SYSTEM EMPLOYING AUTOMATED VIRTUAL DEPTH EVENT DETECTION AND SIGNALING; U.S. Pat. No. 9,599,499, issued Mar. 21, 2017, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,638,824, issued May 2, 2017, entitled QUAD-GRADIENT COILS FOR USE IN LOCATING SYSTEMS; U.S. patent application Ser. No. 13/769,202, filed Feb. 15, 2013, entitled SMART PAINT STICK DEVICES AND METHODS; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,547,428, issued Oct. 1, 2013, entitled PIPE MAPPING SYSTEM; U.S. Pat. No. 8,635,043, issued Jan. 21, 2014, entitled Locator and Transmitter Calibration System; U.S. Pat. No. 9,632,199, issued Apr. 25, 2017, entitled INDUCTIVE CLAMP DEVICES, SYSTEMS, AND METHODS; U.S. Pat. No. 9,057,754, issued Jun. 16, 2015, entitled ECONOMICAL MAGNETIC LOCATOR APPARATUS AND METHOD; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR PORTABLE LOCATOR; U.S. Pat. No. 9,341,740, issued May 17, 2016, entitled OPTICAL GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. patent application Ser. No. 15/345,421, filed Nov. 7, 2016, entitled OMNIINDUCER TRANSMITTING DEVICES AND METHODS; U.S. Pat. No. 9,488,747, issued Nov. 8, 2016, entitled DUAL ANTENNA SYSTEMS WITH VARIABLE POLARIZATION; U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/457,149, filed Mar. 13, 2017, entitled USER INTERFACES FOR UTILITY LOCATOR; U.S. patent application Ser. No. 15/457,222, filed Mar. 13, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. patent application Ser. No. 15/470,642, filed Mar. 27, 2017, entitled UTILITY LOCATING APPARATUS AND SYSTEMS USING MULTIPLE ANTENNA COILS; U.S. patent application Ser. No. 15/470,713, filed Mar. 27, 2017, entitled UTILITY LOCATORS WITH PERSONAL COMMUNICATION DEVICE USER INTERFACES; U.S. patent application Ser. No. 15/483,924, filed Apr. 10, 2017, entitled SYSTEMS AND METHODS FOR DATA TRANSFER USING SELF-SYNCHRONIZING QUADRATURE AMPLITUDE MODULATION (QAM); U.S. patent application Ser. No. 15/485,082, filed Apr. 11, 2017, entitled MAGNETIC UTILITY LOCATOR DEVICES AND METHODS; U.S. patent application Ser. No. 15/485,125, filed Apr. 11, 2017, entitled INDUCTIVE CLAMP DEVICES, SYSTEMS, AND METHODS; U.S. patent application Ser. No. 15/490,740, filed Apr. 18, 2017, entitled NULLED-SIGNAL UTILITY LOCATING DEVICES, SYSTEMS, AND METHODS; U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES; U.S. patent application Ser. No. 15/590,964, filed May 9, 2017, entitled BORING INSPECTION SYSTEMS AND METHODS; U.S. patent application Ser. No. 15/623,174, filed Jun. 14, 2017, entitled TRACKABLE DIPOLE DEVICES, METHODS, AND SYSTEMS FOR USE WITH MARKING PAINT STICKS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,684,090, issued Jun. 20, 2017, entitled NULLED-SIGNAL LOCATING DEVICES, SYSTEMS, AND METHODS; U.S. patent application Ser. No. 15/633,682, filed Jun. 26, 2017, entitled BURIED OBJECT LOCATING DEVICES AND METHODS; U.S. Pat. No. 9,696,448, filed Jul. 4, 2017, entitled GROUND-TRACKING DEVICES AND METHODS FOR USE WITH A UTILITY LOCATOR; U.S. patent application Ser. No. 15/681,409, filed Aug. 20, 2017, entitled WIRELESS BURIED PIPE AND CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,784,837, issued Oct. 10, 2017, entitled OPTICAL ROUND TRACKING APPARATUS, SYSTEMS AND METHODS; U.S. Pat. No. 9,798,033, issued Oct. 24, 2017, entitled SONDE DEVICES INCLUDING A SECTIONAL FERRITE CORE; U.S. patent application Ser. No. 15/811,361, filed Nov. 13, 2017, entitled OPTICAL GROUND TRACKING APPARATUS, SYSTEMS, AND METHODS; U.S. Pat. No. 9,841,503, issued Dec. 12, 2017, entitled OPTICAL GROUND TRACKING APPARATUS, SYSTEMS, AND METHODS; U.S. patent application Ser. No. 15/846,102, filed Dec. 18, 2017, entitled SYSTEMS AND METHODS FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. Pat. No. 9,880,309, issued Jan. 30, 2018, entitled UTILITY LOCATOR TRANSMITTER APPARATUS AND METHODS; #U.S. patent application Ser. No. 15/889,067, filed Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. Pat. No. 9,927,545, issued Mar. 27, 2018, entitled MULTI-FREQUENCY LOCATING SYSTEMS AND METHODS; U.S. Pat. No. 9,927,546, filed Mar. 27, 2018, entitled PHASE-SYNCHRONIZED BURIED OBJECT TRANSMITTER AND LOCATOR METHODS AND APPARATUS; U.S. Pat. No. 9,928,613, issued Mar. 27, 2018, entitled GROUND TRACKING APPARATUS, SYSTEMS, AND METHODS; U.S. Pat. No. 9,959,641, issued May 1, 2018, entitled METHODS AND SYSTEMS FOR SEAMLESS TRANSITIONING IN INTERACTIVE MAPPING SYSTEMS; U.S. Pat. No. 10,027,526, issued Jul. 17, 2018, entitled METHODS AND APPARATUS FOR HIGH-SPEED DATA TRANSFER EMPLOYING SELF-SYNCHRONIZING QUADRATURE AMPLITUDE MODULATION (QAM); U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNIINDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. Pat. No. 10,073,186, issued Sep. 11, 2018, entitled KEYED CURRENT SIGNAL UTILITY LOCATING SYSTEMS AND METHODS; U.S. Pat. No. 10,078,149, issued Sep. 18, 2018, entitled BURIED OBJECT LOCATOR APPARATUS AND SYSTEMS; U.S. Pat. No. 10,082,599, issued Sep. 25, 2018, entitled MAGNETIC SENSING BURIED OBJECT LOCATOR INCLUDING A CAMERA; U.S. patent application Ser. No. 16/144,878, filed Sep. 27, 2018, entitled MULTIFUNCTION BURIED UTILITY LOCATING CLIPS; U.S. patent application Ser. No. 16/178,494, filed Nov. 1, 2018, entitled THREE-AXIS MEASUREMENT MODULES AND SENSING METHODS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent Ser. No. 16/449,187, filed Jun. 21, 2019, entitled ACTIVE MARKER DEVICES FOR UNDERGROUND USE; U.S. Pat. No. 10,247,845, issued Apr. 2, 2019, entitled UTILITY LOCATOR TRANSMITTER APPARATUS AND METHODS; U.S. Utility patent application Ser. No. 16/382,136, filed Apr. 11, 2019, entitled GEOGRAPHIC MAP UPDATING METHODS AND SYSTEMS; U.S. Pat. No. 10,274,632, issued Apr. 30, 2019, entitled UTILITY LOCATING SYSTEMS WITH MOBILE BASE STATION; U.S. Provisional Patent Application 62/870,443, filed Jul. 3, 2019, entitled AUTOTUNING MODULES; U.S. Pat. No. 10,353,103, filed Jul. 16, 2019, entitled SELF-STANDING MULTI-LEG ATTACHMENT DEVICES FOR USE WITH UTILITY LOCATORS; U.S. Pat. No. 10,371,305, issued Aug. 6, 2019, entitled DOCKABLE TRIPODAL CAMERA CONTROL UNIT; U.S. Pat. No. 10,401,526, issued Sep. 3, 2019, entitled BURIED UTILITY MARKER DEVICES, SYSTEMS, AND METHODS; U.S. Provisional Patent Application 62/899,296, filed Sep. 12, 2019, entitled ANTENNA SYSTEMS FOR CIRCULARLY POLARIZED RADIO SIGNALS; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES. The content of each of the above-described patents and applications is incorporated by reference herein in its entirety. The above-described patent applications and patents may be referred to herein collectively as the "co-assigned applications" or "incorporated applications."

In another aspect, a locator embodiment is disclosed which includes multiple front-end circuit processing circuits wherein each front-end circuit processing circuit may handle the input from a multitude of antenna coils. In a specific embodiment, the locator may have twelve antenna coils, the input of which is handled by three front-end circuit processing circuits. In another specific embodiment, the locator may have ten antenna coils, the input of which is handled by three front-end circuit processing circuits.

In another aspect, the present disclosure may further include methods for switching between receive channels and ADC digital outputs at the DSP. Such methods may include actuating a locator device and sensing the signal at a first receiver channel. The DSP may sample the resulting digital output signal of the first ADC from the low-signal circuit element. Upon detecting clipping at the first ADC beyond a threshold according to some clipping statistic, the DSP may begin sampling the digital output signal from the second ADC of the high-signal circuit element. Once sampled, the front-end signal processing circuit may repeat the method switching to a new receiver channel.

The term "exemplary" is used herein to mean "serving as an example, instance, or illustration." Any aspect and/or embodiment described herein as "exemplary" is not necessarily to be construed as preferred or advantageous over other aspects and/or embodiments.

Exemplary Signal Processing Circuit Apparatus and Method Embodiments

FIG. 1 shows a prior art front-end signal processing circuit 100 for a buried object locator. As shown, the circuit 100 has a differential topology that includes an antenna coil 102 to sense/receive an electromagnetic signal magnetic field component emitted by the buried object as a result of current flow therein and generate an output signal responsive to the sensing.

The antenna coil output signal is passed to electronic circuitry, typically including a pre-amplifier 104 and then an amplifier 106 to amplify the output. The amplified output signals are then passed through an analog-to-digital circuit (ADC) 108 for conversion into a digital output, which may be provided to a digital signal processor (DSP) 110 for further processing digitally.

Such traditional circuits may additionally include other elements as are known in the art, for example, one or more low frequency input band pass filters to block signals present at the antenna coil outside the necessary band pass from reaching the pre-amplifier 104 and/or otherwise attempt to reduce noise in circuit 100, as well as other filters or signal processing electronics as are known in the art.

As circuit 100 is differential, such low pass filters are also differential such that there is no reference to ground and therefore this prior art fails to filter noise injected with respect to ground. Buried object locators employing such a traditional front-end signal processing circuit such as circuit 100 are susceptible to nulls and false peaks resulting in distorted output due to problems inherent in such circuit typology. The electronic circuit 100 may include additional electronics to provide input/output signal 112 further to the locator for additional processing, storage, identifying and/or communicating the presence or location of a utility line to an end user. These may include, for example, wired or wireless communications modules to provide determined information to other communicatively coupled devices, non-transitory memory devices for storing the determined information either internally or on removable memory devices, displays for rendering the information to a user, audio outputs for providing audio representations of the determined information, and the like.

Identifying depth of the buried objects and other desirable information is not practical with such locators. Consequently, these simple locators are almost obsolete now. However, exemplary front-end signal processing circuit 100 of FIG. 1 may be adapted for other devices for use in processing signals. For example, systems, devices, and methods of the incorporated applications using quadrature amplitude modulation (QAM) may be improved upon by including a front-end signal processing circuit in accordance with aspects of the present disclosure using two separate gains and ADCs to improve dynamic range and/or performance.

Figure 2:
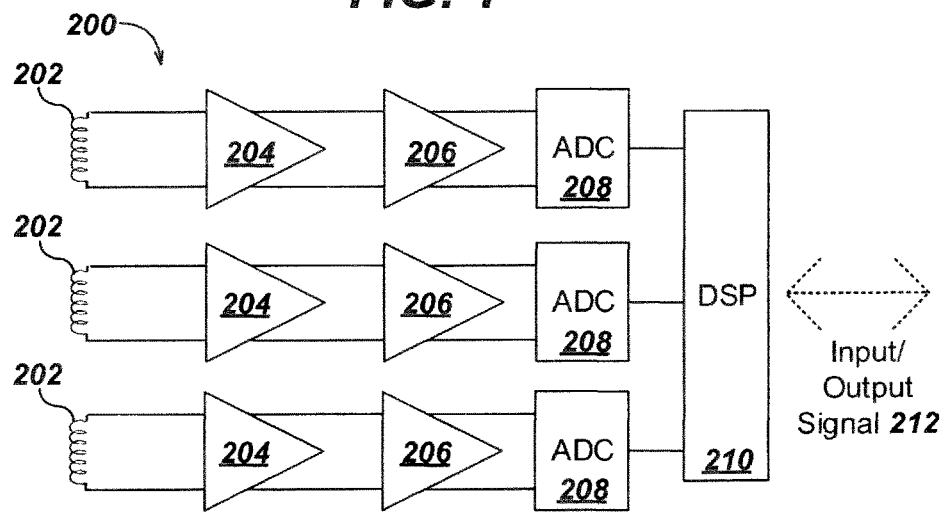
FIG. 2 shows a prior art signal processing circuit for use in locators having a plurality of antenna coils.

FIG. 2 shows another prior art front-end signal processing circuit 200 that may be used in a buried object locator having a plurality of antenna coils for sensing magnetic field signals emitted by a buried utility or other conductor. As shown, circuit 200 uses a differential typology that includes three separate antenna coils 202, however, in other prior art embodiments, such front-end circuits may include any number of antenna coils, each having a corresponding set of pre-amplifier 204, amplifier 206, and ADC 208 coupled thereto to receive and process the signals sensed by their respective antenna coil 202 and produce respective digital outputs that are each provided to a single DSP 210. Circuits such as circuit 200 may additionally include one or more low frequency input band pass filters to block signals present at each antenna coil 202 outside the necessary band pass from reaching the pre-amplifier 204 and/or otherwise attempt to reduce noise in circuit 200. As circuit 200 is differential, such low pass filters are also differential and thus have no reference to ground, consequently failing to filter noise injected with respect to ground. In addition, the circuit 200 typology may be disadvantageous due to the large quantity of costly circuit elements (e.g., the quantity of separate pre-amplifiers 204, amplifiers 206, ADCs 208, and optionally various band pass filters) resulting in increases in both the manufacturing cost and the overall circuit size. The circuit 200 may include additional electronics to provide input/output signal 212 further to the locator for additional processing, storage, identifying and/or communicating the presence or location of a utility line to an end user. These may include, for example, wired or wireless communications modules to provide determined information to other communicatively coupled devices, non-transitory memory devices for storing the determined information either internally or on removable memory devices, displays for rendering the information to a user, audio outputs for providing audio representations of the determined information, and the like.

Figure 3:
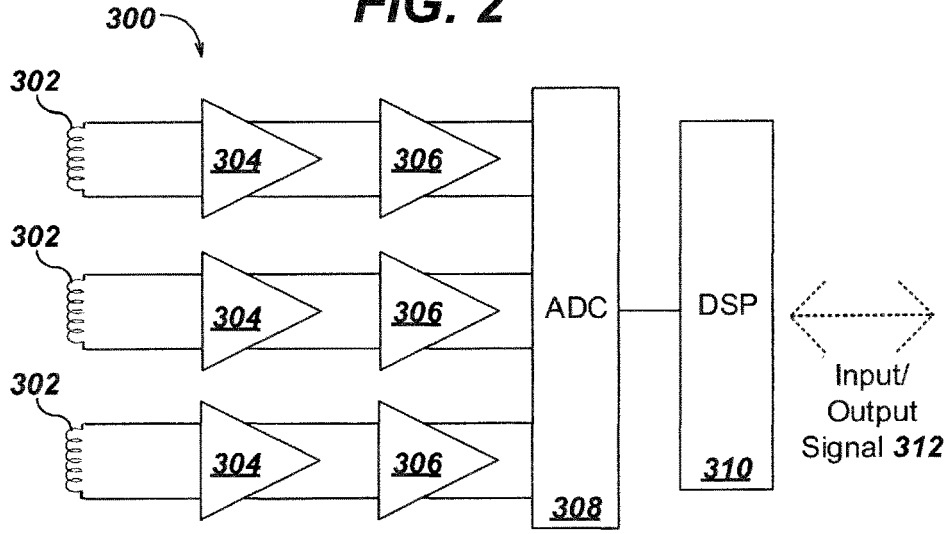
FIG. 3 shows another prior art signal processing circuit for use in locators having a plurality of antenna coils.

FIG. 3 shows yet another prior art front-end signal processing circuit 300 that may be used in a buried object locator having a plurality of antenna coils for sensing signals that may be emitted by a buried utility or other conductor. As shown, circuit 300 illustrates another differential typology that includes three separate antenna coils 302 though, in some other prior art embodiments, such front-end circuits may include any number of antenna coils, each having a corresponding set of pre-amplifier 304 and amplifier 306. Circuit 300 attempts to offset the increased cost by connecting each set of antenna coil 302, pre-amplifier 304, and amplifier 306 to a single multi-channel ADC 308 versus the plurality of individual ADCs 208 of FIG. 2. The multi-channel ADC 308 may switch between each one of the sets of antenna coil 302, pre-amplifier 304, and amplifier 306. The multi-channel ADC 308 may produce digital outputs to a DSP 310 which may further communicate to other locator elements through an input/output signal 312. Circuits such as circuit 300, however, have a slow processing rate due to slow switching, and they introduce undesirable crosstalk interference every time the multi-channel ADC switches between the sets of circuit elements. Moreover, this type of circuit has limited use only and specifically in low frequency locators as slow switching makes it practically impossible to do sampling at higher frequency, such as at 500 khz. As with the circuits of FIG. 1 and FIG. 2, the circuit of FIG. 3 may also include other electronics. These may include, for example, wired or wireless communications modules to provide determined information to other communicatively coupled devices, non-transitory memory devices for storing the determined information either internally or on removable memory devices, displays for rendering the information to a user, audio outputs for providing audio representations of the determined information, and the like.

Figure 4:
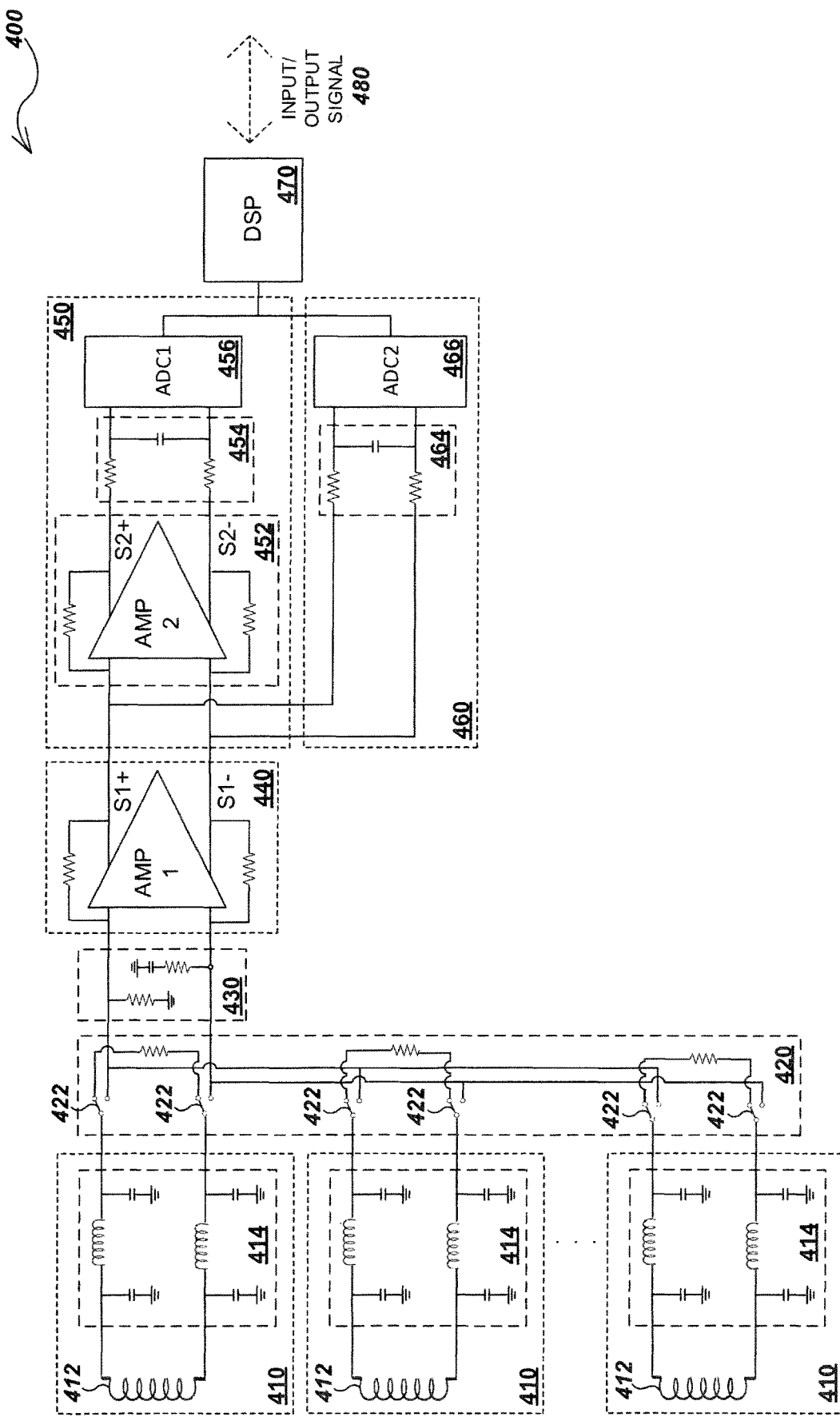
FIG. 4 illustrates an embodiment of a low cost and high performance signal processing circuit for use in a locator system, in accordance with the present invention.

Turning to FIG. 4, details of an embodiment of a low cost, high performance signal processing circuit 400 in accordance with inventive aspects of the disclosure for use in locators or other devices, with a plurality of receiver channels 410, is illustrated. Exemplary embodiments include but are not limited to locators having two or more omnidirectional antenna arrays comprising three orthogonally oriented antenna coils and two or more gradient antenna coils as well as locators including a dodecahedral antenna array comprising twelve antenna coils, as well as combinations of these antenna configuration and other antenna configurations as known or developed in the art.

Each receiver channel 410 includes or is coupled via an input to an antenna coil 412 and one or more low pass filters 414, with elements coupled to be returned to ground rather than differentially output. The receiver channels may be disposed approximate to and coupled to the corresponding antenna coil 412 in an exemplary embodiment.

A switching mechanism 420 is included to actuate a set of switches 422 that are connected to each low pass filter 414 on each receiver channel 410. The switches 422 of switching mechanism 420 are provided for selectively making or breaking electrical connections between receiver channels 410 and other circuit elements, in particular, a damped low pass filter 430, whose elements are returned to ground rather than differentially, and further to a first wide band amplifier 440. The first wide band amplifier 440 may separately connect to a low-signal circuit element 450 and high-signal circuit element 460. The low-signal circuit element 450 may, continuing from the first wide band amplifier 440, include a second wide band amplifier 452, further connecting to an antialiasing filter 454 which in turn is connected to a first analog-to-digital converter (ADC) 456. The high-signal circuit element 460 may, separately continuing from the first wide band amplifier 440, include an antialiasing filter 464 connected to a second ADC 466. The circuit 400 may further include a digital signal processor (DSP) 470 connected to both the first ADC 456 and second ADC 466.

The receiver channel 410 may be either in a connected or disconnected state. In a connected state, a receiver channel 410 may provide sensed and filtered signals to the damped low pass filter 430, first wide band amplifier 440, and low-signal circuit element 450 or high-signal circuit element 460. In a disconnected state, the switch may prevent signals from travelling to the damped low pass filter 430, first wide band amplifier 440, and low-signal circuit element 450 or high-signal circuit element 460. In circuit 400, one receiver channel 410 may be in a connected state at a time. When in a disconnected state, the receiver channels 410 may receive the incoming signal resulting in a load having an impedance matching that of the damped low pass filter 430 and first wide band amplifier 440.

In a connected state, signals reaching the first wide band amplifier 440 are amplified to produce a first output having a first gain value. This first output is provided simultaneously as an input to the low-signal circuit element 450 and the high-signal circuit element 460. In the low-signal circuit element 450, the input may be provided to the second wide band amplifier 452, further connecting to an antialiasing filter 454 which in turn is connected to the first ADC 456 producing a first digital output at the second, amplified gain level. When clipping occurs at the second wide band amplifier 452, the phase of the signal may be preserved due to the wide band aspect of the second wide band amplifier 452. In the high-signal circuit element 460, the input may be provided to an antialiasing filter 464 which in turn is connected to the second ADC 466 producing a second digital output at the first gain level. The DSP 470, receiving the first digital output from the low-signal circuit element 450 and the second digital output from the low-signal circuit element 460, may use some clipping statistics to determine which digital output or outputs to use in determining the location of the signal source. For instance, when the clipping has occurred past a threshold according to some clipping statistic (as described in method 700 of FIG. 7) at the first ADC 456 of the low-signal circuit element 450, the DSP 470 may switch to the first digital output provided by the high-signal circuit element 460. As phase is preserved in signals clipping at the second wide band amplifier 452, the DSP 470 may opt to reconstruct signals using digital input signals from the first ADC 456 and second ADC 466. As a result, additional gain is achieved at all frequencies before clipping limits the system performance while providing lower cost and more compact circuitry with lower power consumption. From the DSP 470, input/output signals 480 may communicate with other elements of a locator device.

Figure 5:
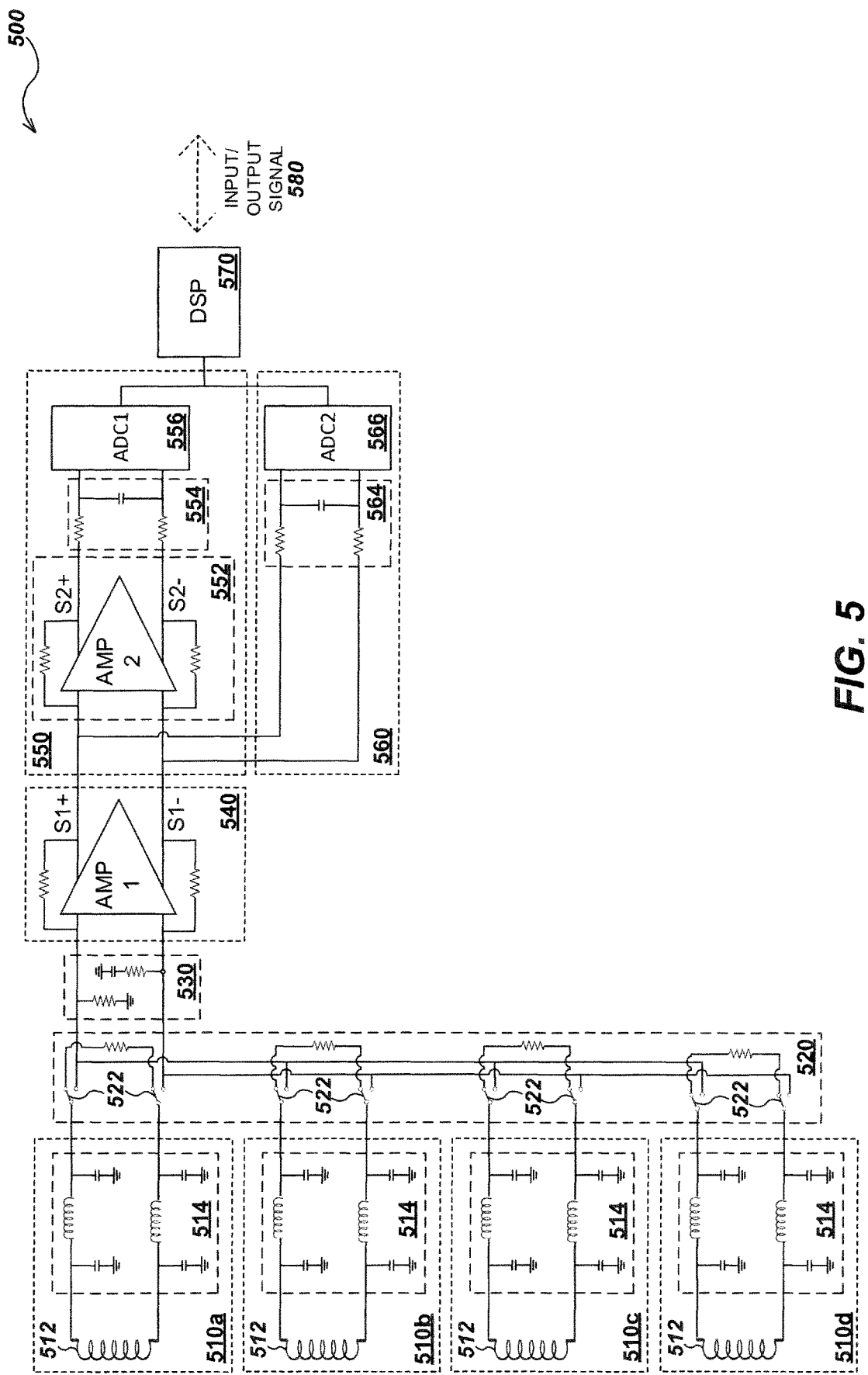
FIG. 5 illustrates a specific embodiment of a low cost and high performance signal processing circuit having four receiver channels for use in a locator system.

A front-end signal processing circuit in keeping with the present disclosure may have any number of receiver channels. In a specific embodiment, as illustrated in FIG. 5, the front-end signal processing circuit 500 may have four receiver channels 510a, 510b, 510c, and 510d. The signal processing circuit 500 may be or share aspects with the signal processing circuit 400 of FIG. 4.

In signal processing circuit 500 of FIG. 5, each receiver channel 510a-510d includes an antenna coil 512 and at least one low pass filter 514 whose elements are returned to ground rather than differentially may be disposed approximate to and coupled to the corresponding antenna coil 512. The signal processing circuit 500 further includes a switching mechanism 520 adapted to actuate a set of switches 522 that are connected to each low pass filter 514 on each receiver channel 510a-510d to make or break the electrical connection between the receiver channels 510a-510d and other circuit elements, in particular, a damped low pass filter 530 whose elements are returned to ground rather than differentially and further make or break the electrical connection between a first wide band amplifier 540. The first wide band amplifier 540 may separately connect to a low-signal circuit element 550 and high-signal circuit element 560. The low-signal circuit element 550 may, continuing from the first wide band amplifier 540, include a second wide band amplifier 552, which further connects to an antialiasing filter 554 which in turn is connected to a first ADC 556. The high-signal circuit element 560 may, separably continuing from the first wide band amplifier 540, include an antialiasing filter 564 connected to a second ADC 566. A DSP 570 may communicate signal with the first ADC 556 and second ADC 566. It should be noted that the low-gain anti-aliasing filter 564 may also be to equalize the delays between low gain and high gain channels such that associated signals arrive at the ADC 566 at the same time.

Each receiver channel 510a-510d may be either connected, allowing sensed and filtered signals to the damped low pass filter 530, first wide band amplifier 540, and low-signal circuit element 550 and high-signal circuit element 560, or in a disconnected state preventing signals to travel to the damped low pass filter 530, first wide band amplifier 540, and low-signal circuit element 550 and high-signal circuit element 560, such that one of the receiver channels 510a-510d may be in a connected state at a time. The remainder of the receiver channels 510a-510d may be in a disconnected state having a load with an impedance matching that of the damped low pass filter 530 and first wide band amplifier 540.

In the connected state, signals reaching the first wide band amplifier 540 are amplified to produce a first output having a first gain value. This first output is provided simultaneously as an input to the low-signal circuit element 550 and the high-signal circuit element 560. In the low-signal circuit element 550, the input may be provided to the second wide band amplifier 552, further connecting to an antialiasing filter 554 which in turn is connected to the first ADC 556 producing a first digital output at the second, amplified gain level. When clipping occurs at the second wide band amplifier 552, the phase of the signal may be preserved due to the wide band aspect of the second wide band amplifier 552. In the high-signal circuit element 560, the input may be provided to an antialiasing filter 564 which in turn is connected to the second ADC 566 producing a second digital output at the first gain level. It should be noted that the low-gain anti-aliasing filter 564 may be altered to equalize delays and cause signals of the low-signal circuit element 550 and signals of the high-signal circuit element 560 to at the ADCs 556 and 566 at the same time. The DSP 570, receiving the first digital output from the low-signal circuit element 550 and the second digital output from the high-signal circuit element 560, may use some clipping statistics to determine which digital output or outputs to use in determining the location of the signal source. For instance, when the clipping has occurred past a threshold of some clipping statistic (as described in method 700 of FIG. 7) at the first ADC 556 of the low-signal circuit element 550, the DSP 570 may switch to the first digital output provided by the high-signal circuit element 560. As phase is preserved in signals clipping at the second wide band amplifier 552, the DSP 570 may opt to reconstruct signals using digital input signals from the first ADC 556 and second ADC 566. As a result, additional gain is achieved at all frequencies before clipping limits the system performance while providing lower cost and more compact circuitry with lower power consumption. From the DSP 570, input/output signals 580 may communicate with other elements of a locator device.

Figure 6:
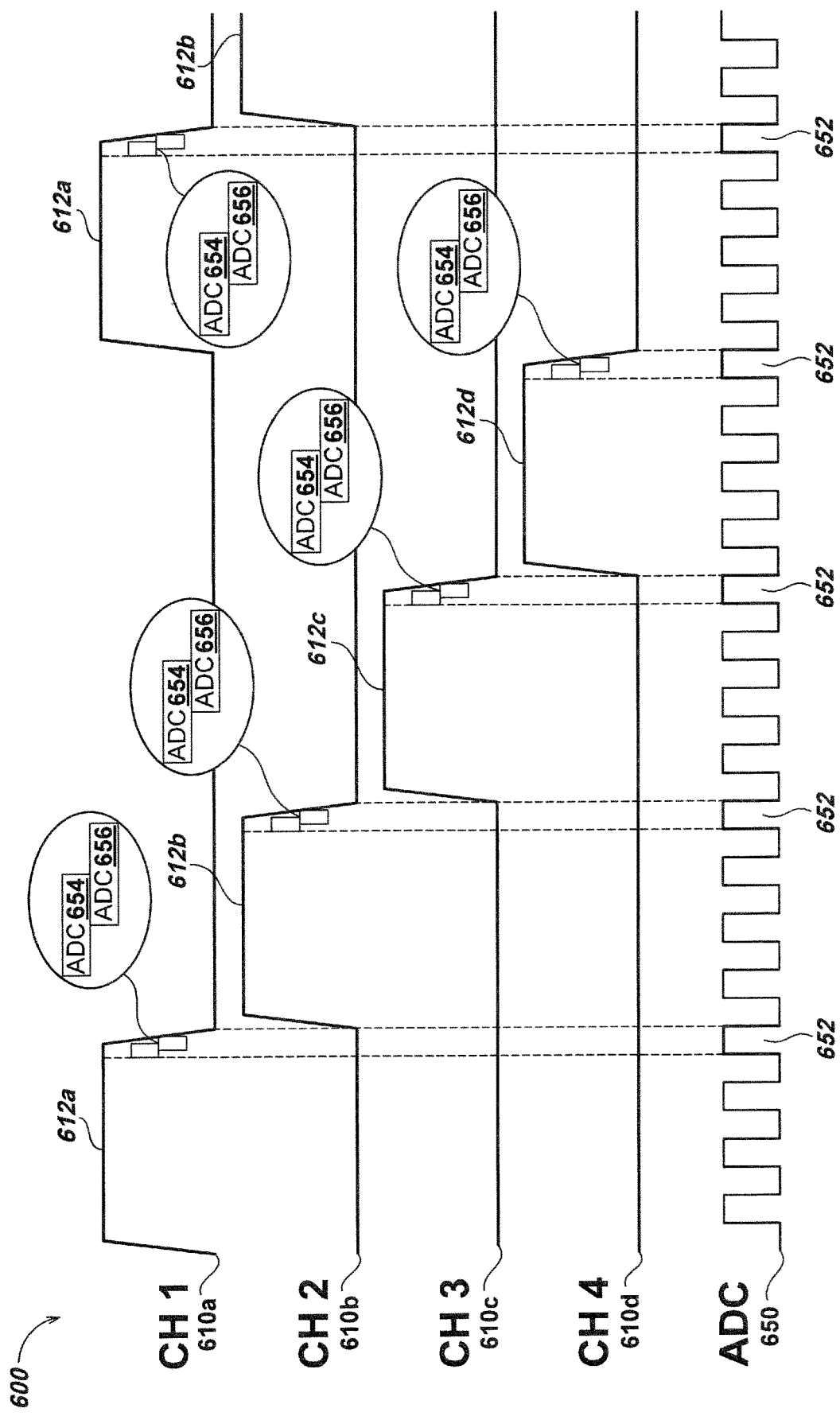
FIG. 6 is a diagram describing switching or multiplexing between receiver channels and digital outputs of the multiple ADCs.

Turning to FIG. 6, a diagram 600 illustrates time multiplexing or switching between receiver channels of a front-end signal processing circuit in keeping with the present disclosure. The diagram 600 illustrates switching between a four receiver channel signal processing circuit as described in signal processing circuit 500 of FIG. 5. In other signal processing circuits in keeping with the present disclosure, time multiplexing or switching may occur between any number of receiver channels.

Illustrated in diagram 600 of FIG. 6, a first receiver channel 610a may sample input signal 612a which may be emitted by a conductive utility line for a period of time. The first channel 610a, being in a connected state, may communicate the sampled input signal 612a to a first amplifier and further onto separate low-signal and high-signal circuit elements each containing an ADC as described with circuit 400 of FIG. 4 and circuit 500 of FIG. 5. Once sampled, the first channel 610a may switch to a second channel 610b allowing receiver channel 610b to sample the input signal 612b. This may repeat such that the circuit may time multiplex or switch between the receiver channels 610a, 610b, 610c, and 610d. It should be noted that the ADCs 650 may have a high speed clock (e.g., 100 MHz) in which one reading cycle 652 may sample the input signal 612. To compensate for signal settling and delay within the amplifier, the reading cycle 652 of ADCs 650 may sample the signal 612 of the connected state receiver channel 610 such that the reading cycle 652 occurs towards the end of each signal 612 sample period. In some embodiments, the actual ADC sampling time may occur after the end of the signal sample time due to delay in the amplifier stages. It should be noted that both low frequency delay, due to, for example, AC coupling, and high frequency delay, due to bandwidth limitations, may need to be accounted for in the ADC sampling time.

Continuing with diagram 600 of FIG. 6, the first ADC 654 may correspond to that present in a low-signal circuit element, and the second ADC 656 may correspond to that present in a high-signal circuit element. In the sampling of signals 612a-612d of each receiver channel 610a-610d in a connected state, the corresponding digital output of each ADC 654 or 656 may overlap. For instance, the ADC 654 and ADC 656 may produce 16 bits of data that overlap producing 24 bits of data relating to each input signal 612a-612d.

Figure 7:
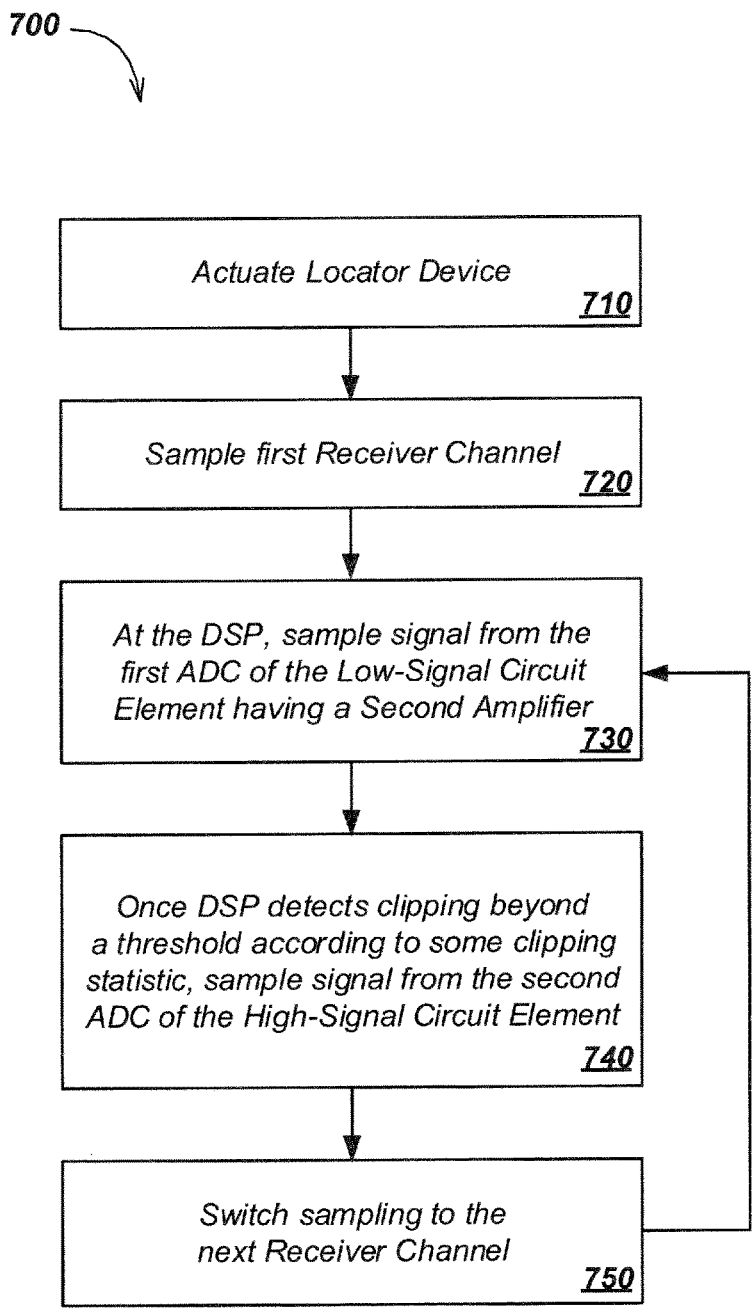
FIG. 7 is a method describing time multiplexing between receiver channels and sampling the ADCs.

Turning to FIG. 7, a method 700 describes the time multiplexing between receiver channels and sampling at the ADCs in a front-end signal processing circuit in keeping with the present disclosure with a locator device. In a first step 710, the locator may be actuated. In a step 720, the first receiver channel may sample the input signal. In a connected state, the input signal may further communicate to the first amplifier and further to the low-signal circuit element and high-signal circuit element. In a step 730, the DSP may sample the signal from the first ADC associated with the low-signal circuit element having a second amplifier and benefitting from the improved gain. In a step 740, once the DSP detects clipping beyond a threshold according to some clipping statistic, the DSP may sample the signal from the second ADC associated with the high-signal circuit element. It is noted that overlap of the sampled signal may occur as previously described with FIG. 6. Upon completing the sample cycle, in a step 750 the circuit may switch to the next receiver channel. The method 700 may then repeat at step 730 until the locating procedure has been completed.

Figure 8A:
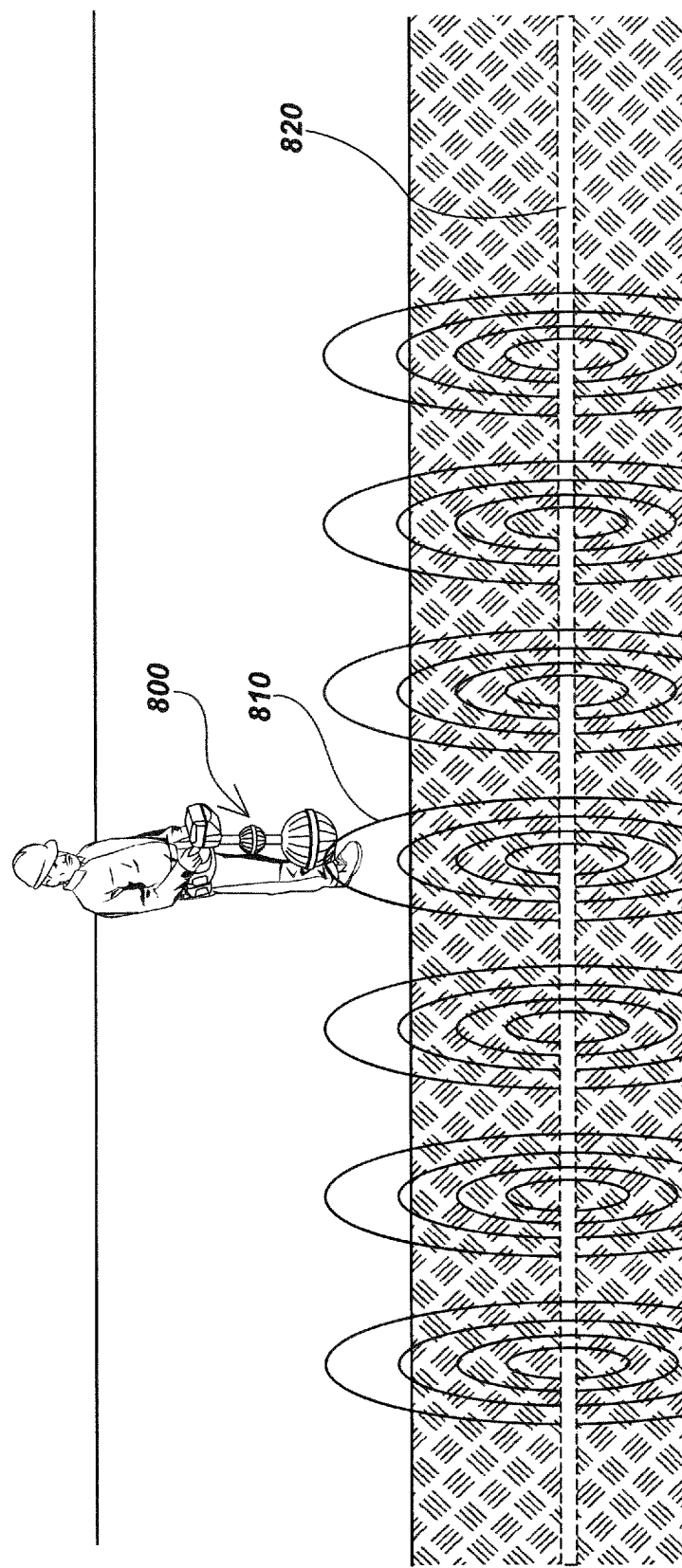
FIG. 8A is an illustration a locator device in a locating operation.

Turning to FIG. 8A, a locator device 800 is illustrated sensing signal 810 emitted by a buried utility line 820. As illustrated, the locator device 800 may be a dodecahedral antenna array. In other locator embodiments, the locator may have a ten antenna array or an antenna array containing any number of antennas. In some locator embodiments, one front-end signal processing circuit in keeping with the present disclosure may multiplex between the various antennas. In other embodiments, multiple front-end signal processing circuits may be used.

Figure 8B:
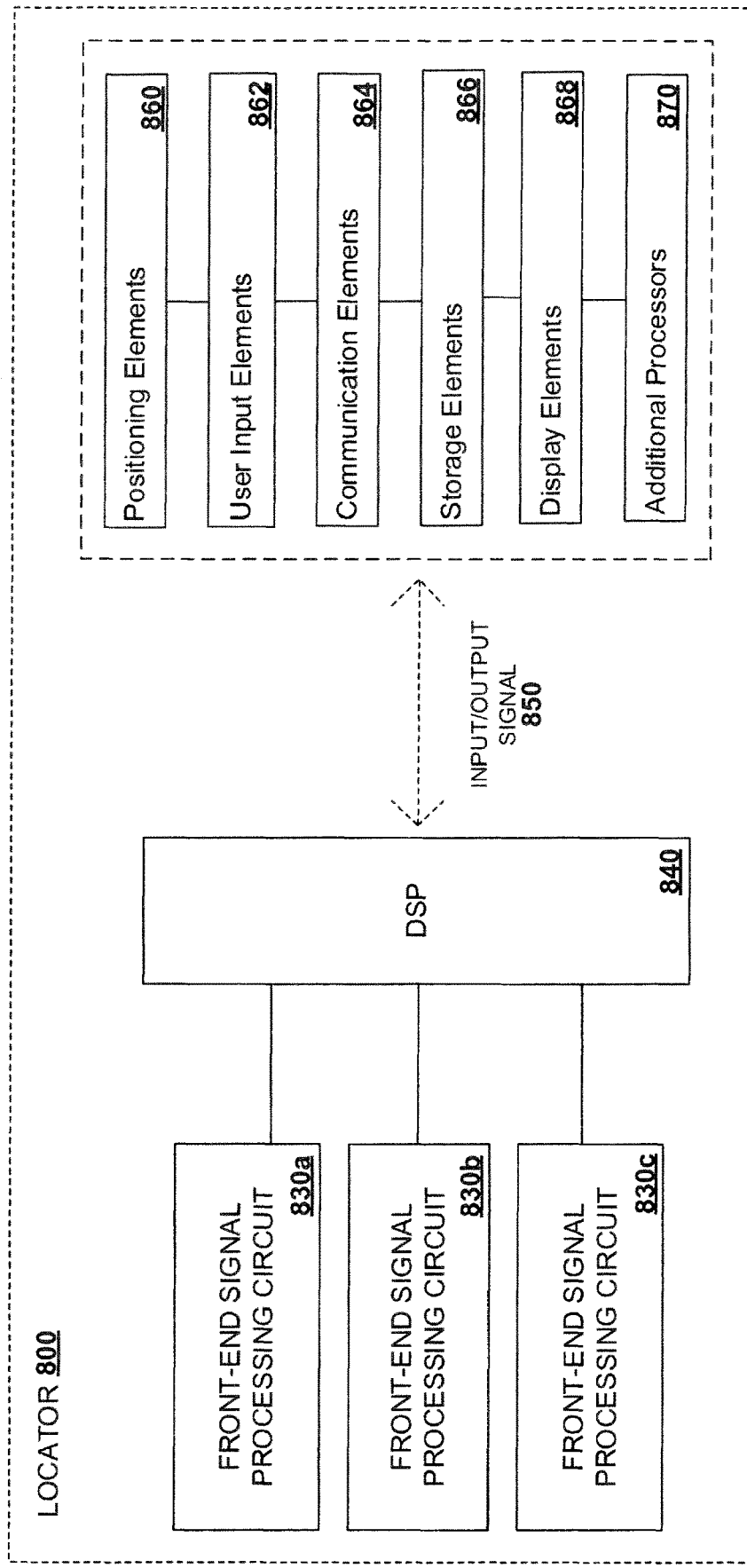
FIG. 8B is a diagram of the locator device from FIG. 8A.

Illustrated in FIG. 8B, the locator 800 may have three separate front-end signal processing circuits 830a-830c such that each front-end signal processing circuit 830a-830c may handle processing for four receiver channels as shown with the circuit 500 of FIG. 5. The locator 800 may have the various circuits 830a-830c sharing a DSP 840. In other multiple signal processing circuit embodiments, each receiver channel may have its separate DSP where each individual DSP may be configured to the other DSPs. The DSP 840 may communicate input/output signals 850 with other elements of a locator device 800.

For instance, the locator 800 may include one or more positioning elements 860 for producing position data relevant to position and pose of the locator 800 along the Earth's surface as it is moved about the locate area. Such positioning elements may include GPS or other global navigation satellite system receivers, inertial navigation sensors or sensor arrays, optical motion tracking devices, and/or the like.

The locator 800 may further include one or more user input elements 862 to receive input and commands from one or more users. For instance, such input may be from a keyboard or other buttons which may be pressed by a user. Other user input may include audio commands or like input recorded by the user at the locator 800.

The locator 800 may further include one or more communication elements 864 for communicating data to other locator system devices that are not illustrated herein (e.g., through WIFI, Bluetooth, or similar communication links). The communication element 864 may provide data communication between the locator 800 and, for instance, other utility locators, transmitter devices, remote servers or databases, base stations, smart phone, laptops, and/or other computing devices, and other devices as described in the various locating systems of the incorporated applications.

The locator 800 may further include one or more storage elements 866 for storing the front-end signal processing circuit's data as well as data from the various post-signal processing circuit elements.

The locator 800 may further include one or more display elements 868 for communicating the utility line and related data to users. For instance, the display elements 868 may include data used to display maps or other visual representations of the locating operation and utility line positions in the ground. The display elements 868 may further include data used to communicate to a user through other ways such as through audio signals and/or haptic feedback.

The locator 800 may further include one or more additional processors 870 to further process received data which may include data from the front-end signal processing circuits 830a-830c as well as other post-signal processing circuit elements (e.g., position element, user input, communication element, or other storage element data).

Other combinations of the elements, components, features, and/or functions described previously herein may be combined in various embodiments. In addition, details regarding additional aspects, elements, components, features, functions, apparatus, and/or methods which may be used in additional embodiments in conjunction with disclosures herein are described in the co-assigned incorporated applications.

Those of skill in the art would understand that information and signals, such as analog or video signals, data signals, audio signals, or other information signals may be represented and transmitted using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The scope of the presently claimed invention is not intended to be limited to the aspects shown and described previously herein, but should be accorded the widest scope consistent with the disclosures herein and associated drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed embodiments and aspects is provided to enable any person skilled in the art to make or use embodiment of the present invention. Various modifications to these embodiments and aspects will be readily apparent to those skilled in the art, and the generic principles defined herein may be applied to other embodiments and aspects without departing from the spirit or scope. Therefore, the presently claimed invention is not intended to be limited specifically to the aspects and embodiments shown herein but is to be accorded the widest scope consistent with the following claims and their equivalents.

We claim:

1. A multiplexing input circuit, comprising:
   a plurality of separate channel circuits having inputs operatively coupled to respective antennas;

a multiplexing circuit operatively coupled to outputs of the channel circuits for time division multiplexing the channel circuit outputs and providing multiplexed output signals;

one or more connected amplifiers, with at least one connected amplifier operatively coupled to an output of the multiplexing circuit;

one or more analog-to-digital converters operatively coupled to outputs of the one or more connected amplifiers, wherein the total number of analog-to digital converters is smaller than the number of channel circuits and antennas;

a digital signal processing circuit operatively coupled to outputs of the one or more analog-to-digital converters to process the analog to digital converter outputs to determine information associated with the antenna output; and a switching mechanism;

wherein one of the plurality of channel circuits is configured to be put into an open state at a time allowing an output signal to bypass the switching mechanism.

2. The multiplexing input circuit of claim 1, wherein a remainder of the plurality of channel circuits not in the open state are configured to be put into a closed state at the same time.

3. The multiplexing input circuit of claim 2, wherein the channel circuits put into the closed state include impedance matching circuitry to match the impedance of circuitry past the switching mechanism.

4. A method of electronically processing magnetic field signals in a buried utility locator, comprising:

receiving at six or more magnetic field sensing antenna coils magnetic field antenna signals and providing the received magnetic field antenna signals to corresponding antenna outputs; and receiving, in a signal processing circuit including a plurality of receiver channel circuits having inputs operatively coupled to the corresponding antenna outputs, the antenna output signals and providing corresponding receiver channel outputs;

receiving, at a multiplexing circuit operatively coupled to the receiver channel circuits, the receiver channel outputs;

time division multiplexing the receiver channel outputs and providing one or more multiplexed output signals at multiplexing circuit outputs;

receiving, at one or more connected amplifiers, with at least one connected amplifier operatively coupled to one or more outputs of the multiplexing circuit, multiplexed outputs;

providing the multiplexed outputs to one or more analog-to-digital converters operatively coupled to the multiplexed outputs, wherein the total number of analog-to digital converters is smaller than the number of antenna coils and receiver channel circuits and wherein the analog-to digital converters include outputs;

digitizing the analog-to-digital converter outputs; and storing the digitized analog-to-digital converter outputs in a non-transitory memory;

wherein the receiver channel circuits include a low pass filter circuit configured so as to couple a signal path to ground rather than being differentially coupled to the multiplexing circuit.

5. The method of claim 4, wherein the multiplexing circuit includes a switching circuit for time-division multiplexing signals from ones of the plurality of receiver channels, wherein one receiver channel is put in an open state at a time allowing its signal past the switching mechanism and the remainder of receiver channels are put into a closed state to block their signal past the switching mechanism, and wherein the receiver channels that are in a closed state maintain a load having an impedance matching the circuit past the switching mechanism.

6. The method of claim 4, wherein the lowpass filter circuit comprises two capacitors and a resistor operatively coupled there-between, and wherein one terminal of each capacitor is operatively coupled to ground and the other terminal of the first of the two capacitors is operatively coupled to an antenna coil output and the other terminal of the second of the two capacitors is operatively coupled to the multiplexing circuit.

7. The method of claim 4, wherein the connected amplifiers include a first wideband amplifier and a second wideband amplifier, and further comprising:

a damped lowpass filter operatively coupled between an output of the multiplexing circuit and the first wideband amplifier, wherein the damped lowpass filter is operatively coupled to ground rather than differentially, and wherein an output of the first wideband amplifier is operatively coupled to an input of the second wideband amplifier;

a low signal circuit operatively coupled between an output of the second wideband amplifier and one of the analog to digital converters; and a high signal circuit operatively coupled between an output of the first wideband amplifier and another of the analog to digital converters.

8. The method of claim 7, further including an antialiasing filter operatively coupled between the first wideband amplifier and the another of the analog to digital converters.

9. The method of claim 8, wherein the antialiasing filter is configured to separate high signal circuit signals and low-signal circuit signals from reaching respective ADCs simultaneously.

10. The method of claim 4, wherein low frequency and high frequency time delays are electronically adjusted for in ADC sample timing.

11. The method of claim 4, wherein the plurality of antenna coils comprises eight antenna coils.

12. The method of claim 11, wherein the plurality of antenna coils comprises eight antenna coils arranged in two or more orthogonal antenna arrays and a pair of gradient antenna coils.

13. The circuit of claim 1, wherein the plurality of separate channel circuits comprises twelve or more separate channel circuits.

14. The method of claim 4, wherein the plurality of antenna coils comprises twelve antenna coils arranged in a dodecahedral orientation.

* * * * *